United States Patent

Roestenberg et al.

[11] Patent Number: 5,864,292
[45] Date of Patent: Jan. 26, 1999

[54] ANIMAL ELECTRIC SHOCK GUARD

[76] Inventors: Andreas Roestenberg; Frank Roestenberg, both of 1210 Magnolia Ave., Sea Girt, N.J. 08750

[21] Appl. No.: 891,907

[22] Filed: Jul. 14, 1997

[51] Int. Cl.$^6$ .................................................. G08B 23/00
[52] U.S. Cl. ..................... 340/573; 119/52.2; 119/57.9; 256/10
[58] Field of Search ..................... 340/573, 571; 119/57.9, 52.3; 367/232, 139; 456/10

[56] References Cited

U.S. PATENT DOCUMENTS

| | | | |
|---|---|---|---|
| 4,188,622 | 2/1980 | Miller et al. | 340/571 |
| 4,274,123 | 6/1981 | Rogers, Jr. | 361/232 |
| 4,658,386 | 4/1987 | Morris | 367/139 |
| 4,969,418 | 11/1990 | Jones | 119/712 |
| 4,973,029 | 11/1990 | Robbins, III | 256/10 |
| 5,191,857 | 3/1993 | Boaz | 119/52.3 |
| 5,392,732 | 2/1995 | Fry | 119/57.9 |
| 5,471,951 | 12/1995 | Collins | 119/57.9 |

*Primary Examiner*—Benjamin C. Lee
*Attorney, Agent, or Firm*—Nolte, Nolte & Hunter

[57] ABSTRACT

An animal electric shock guard includes a pair of flexible flat conductors extending side-by-side in slightly spaced apart relation on a flexible support strip which adheres to the outer surface of a trash container lid. The conductors are the sides of an open circuit which is closed by the wet nose or tongue of an animal, such as a dog trying to dislocate the lid from the container.

8 Claims, 2 Drawing Sheets

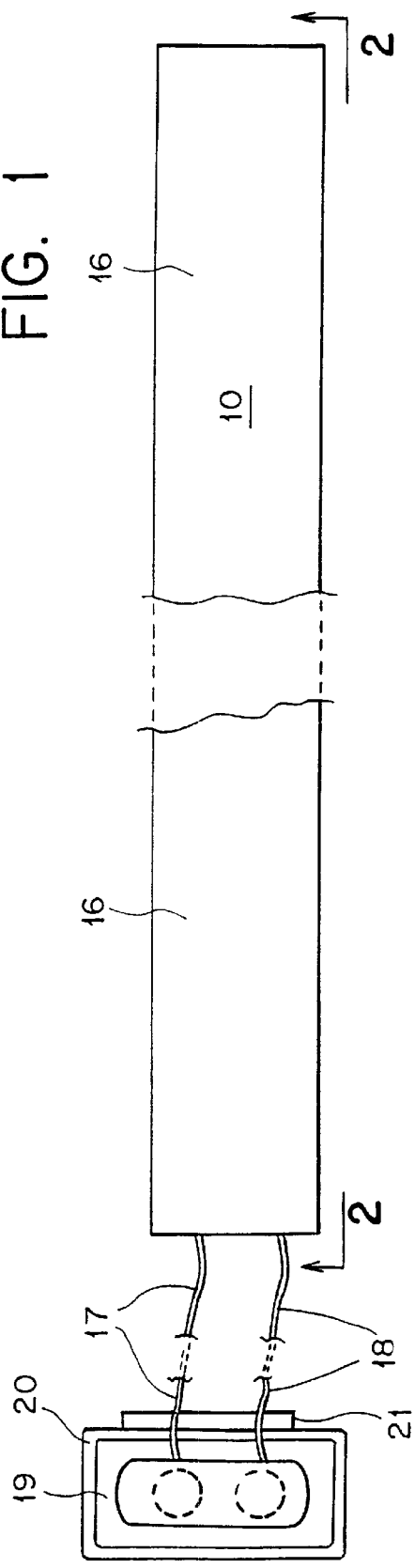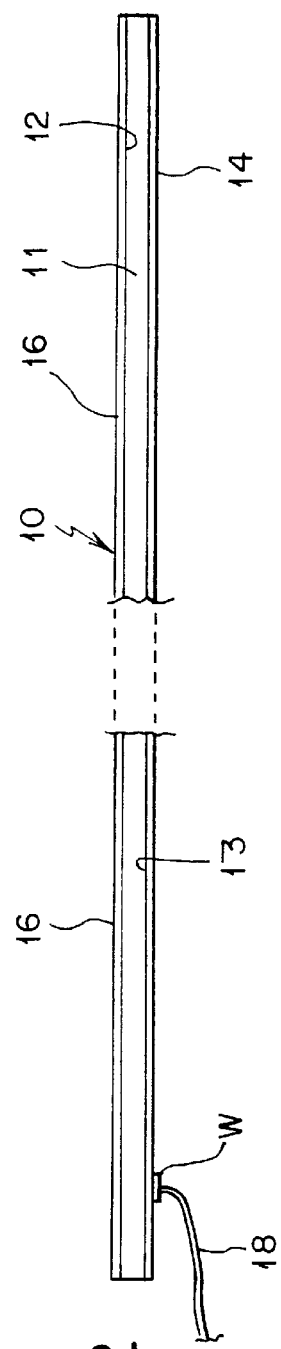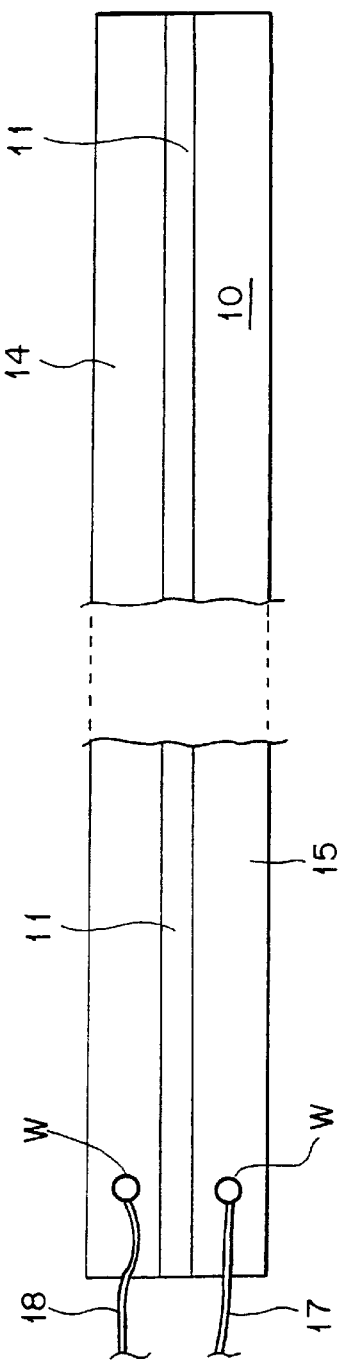

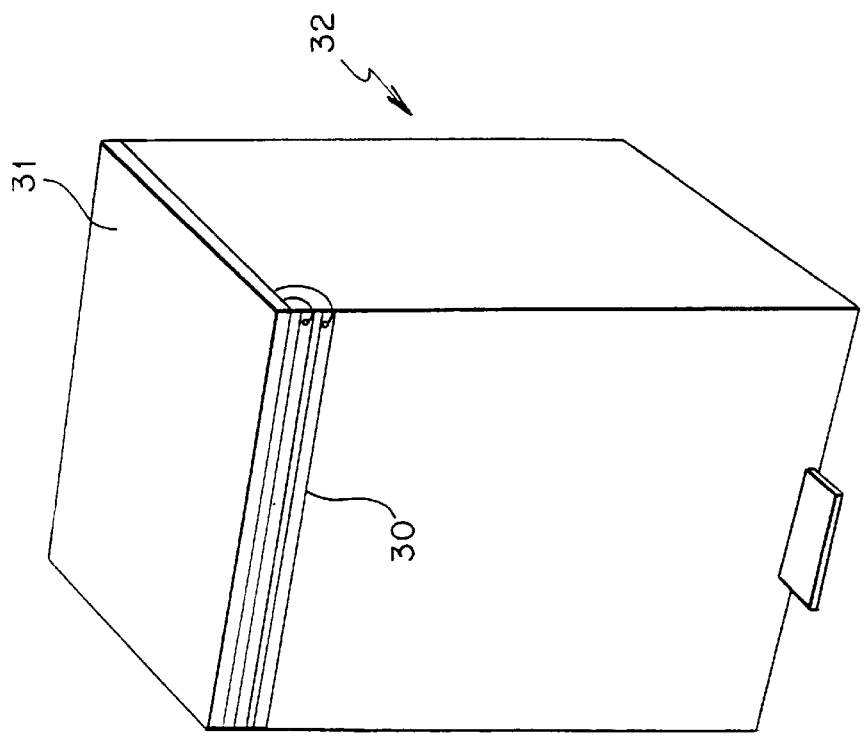
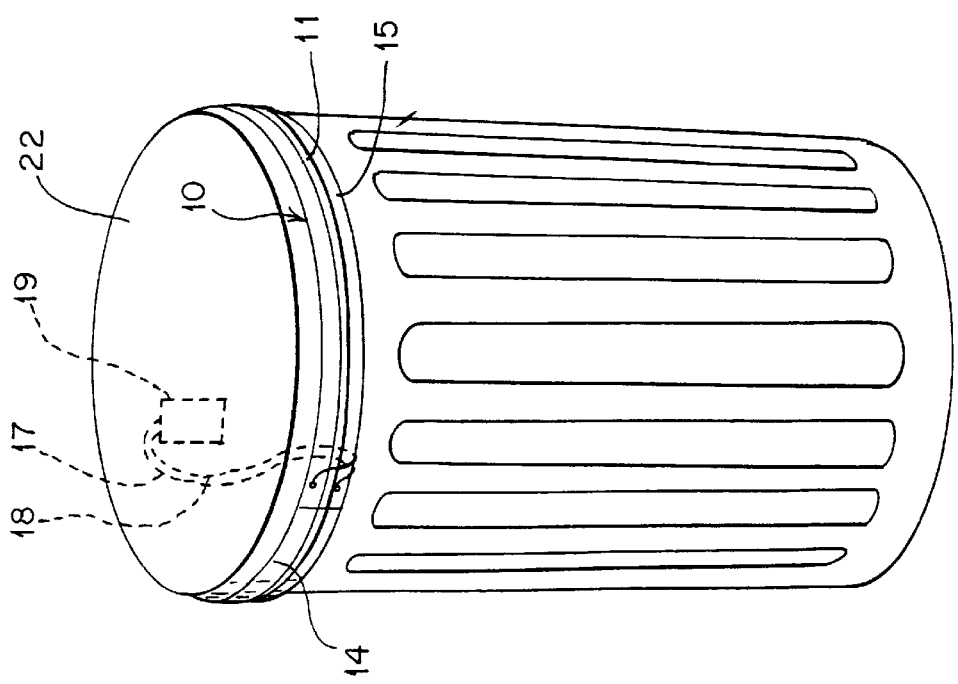

ANIMAL ELECTRIC SHOCK GUARD

FIELD OF THE INVENTION

This invention relates to an electric shock guard for placement about the lower edge of a garbage container lid and which provides a slight electric shock to an intrusive animal, such as a dog, when the animal tries to lift the lid with its moist nose or tongue in contact with conductors supported in the guard.

BACKGROUND OF THE INVENTION

Various types of dog training and animal repellent apparatuses have been devised to repel animals from garbage containers so that they do not cause spillage of trash or, indeed, ingest contaminated food.

One such apparatus is disclosed in U.S. Pat. No. 4,188,622 to Miller in which a strap assembly of dielectric material with a conductor threaded in the strap encompasses a metal garbage pail and is part of a signal generating circuit which sounds an alarm to frighten the intrusive animal.

U.S. Pat. No. 3,366,854 to Robinson et al discloses apparatus for electrically repelling birds and which comprise a pair of electric conductors formed within and on opposite sides of a cable with surface portions of both conductors exposed to insure that opposite digits of a birds foot make contact with the conductors to close the circuit and shock the bird.

Other pest repellent devices are seen in U.S. Pat. No. 5,191,857 to Boaz, which discloses an open circuit which is closed to give a shock to a squirrel intruding upon a bird feed station; and in U.S. Pat. No. 5,471,951 to Collins which discloses an open circuit around a tray style bird feeder which circuit is closed when a squirrel tilts the feeder with its weight.

THE INVENTION

The guard of the present invention comprises a semi-rigid but flexible dielectric flat support strip on the front outer surface of which flat conductors are secured by conventional means, such as by a layer of self-bonding adhesive, and which extend with their flat outer surfaces in a common plane and in side-by-side and very slightly spaced relation. The conductors are connected at their one end via flexible conductive wires to adjacent poles of a nine volt battery. Means may be provided to secure the battery to the under surface of a garbage can lid. The flat support strip is provided with a layer of self-bonding adhesive on both the front, outer surface which acts to retain the conductors on the front outer surface; and on the back inner surface which, prior to use, is initially covered by a strip of removable protective paper which preserves the adhesive on the inner surface until the protective strip is removed to expose the adhesive for attachment to the lower outer edge of the garbage can lid.

Because the conductors are closely spaced, a dog's tongue or wet nose will bridge the slight space between the conductors and close the circuit to give the dog a slight electric shock sufficient to teach the dog to stay away from the garbage can.

In practicing the invention, it is convenient to use a double coated acrylic foam tape made by the 3M Company for the support strip as it is sufficiently rigid to support the flat conductors and sufficiently flexible to bend with the conductors as the apparatus is adhered to the periphery of the garbage can lid. The conductors, which are also semi-rigid, but sufficiently flexible to bend with the support strip, may be conveniently made of available flat steel stock 0.15 mil thick by 5 mil wide. These strips can be cut to any length and in accordance with the invention are, along with the support strip cut to a length sufficient to encompass the lowered edge of a garbage can lid, typically 56 inches or in the instance of an indoor hinged lid a length of 12 inches or more at the lower edge of the front or free end of the lid.

Other materials compatible with the uses just described may, of course, be used.

Note that the guard of this invention is readily fabricated and packaged. The flexibility of the guard lends itself to being rolled for retail sales packaging. The guard provides an open circuit which is closed not by any switch element, but directly by the touch of the intrusive animal's nose or tongue. Note also that the guard is effective on plastic as well as metal garbage cans, inasmuch as the acrylic support strip is an electric insulator.

BRIEF DESCRIPTION OF THE DRAWINGS

FIG. 1 is a schematic bottom top plan view, partly broken away, of the back or inner surface of the guard of the invention and showing its connection to a battery;

FIG. 2 is a schematic plan view of the side of the guard of FIG. 1 taken along the line 2—2 in the direction of the arrows;

FIG. 3 is a schematic top plan view of the front or outer surface of the guard of FIGS. 1 and 2; and FIG. 4 is a schematic frontal perspective view, partly broken away, of a lidded garbage can with the guard of the invention in place.

FIG. 5 is a schematic frontal perspective view of an indoor hinged-lid garbage can.

DETAILED DESCRIPTION OF THE DRAWING

The electric shock guard 10 of the invention comprises a dielectric flat support strip 11 with a layer of self-bonding adhesive, shown only schematically as the surface lines 12 and 13 of the support strip, on the back inner surface 12 and front outer surface 13. Flat conductors 14, 15, in the present instance, 0.15 mm thick steel strips, are supported on the support strip and maintained in position by the self-bonding adhesive on the front, outer surface of the strip. Any other conventional means can be used to support the conductor to the support strip such as rivets. The conductors extend side-by-side with their outer surfaces in a common plane with their juxtaposed side edges slightly spaced apart along the length of the support strip.

Both the strip and conductors are semi-rigid, but sufficiently flexible to bend as they are bonded to the periphery of the lower edge of a garbage can lid 22. In this respect, the back, inner surface of the support strip is provided with a protective strip 16 which is removed to expose the adhesive on the back surface to secure the support strip and conductors to the lid.

The conductors are connected via welds W at their respective one ends via flexible wires 17, 18 to 9 volt battery 19 which, in the present instance, is supported in a caddy 20 on one side of which is a velcro pad 21 for mating with a velcro pad (not shown) on the undersurface of the garbage can lid. Of course, the battery may be supported by other means than velcro and anywhere about the lid or garbage can or even left hanging inside the garbage can.

Inasmuch as the guard is flexible, it may be coiled for packaging. The guard can be made in any length, but it should, at least in situ, be or be cut to extend fully around the garbage can lid as shown in FIG. 4 with the wires 17 and 18 sufficiently long so that the battery 19 can be positioned on the inner surface of the lid 22. While a caddy is shown containing the battery and velcro is here suggested as a means to secure the assembly to the lid, which is supplied with a velcro receptor, any convenient means can be used for supporting the battery on the lid or inside the can. For example, a custom-made garbage can and lid might have the lid hinged to the pail portion and the hinge may contain conductors for connection to the conductors 17 and 18 and which lead to a battery or battery holder within the garbage can or lid.

A short length guard 30 is shown in FIG. 5 secured to the lower edge of the front or free end of the lid 31 of an indoor garbage can 32.

What is claimed is:

1. An electric shock guard for repelling animals, comprising a flexible flat dielectric support strip having oppositely facing flat surfaces, a pair of flexible flat electric conductors supported on one of said oppositely facing flat surface of said flat support strip and extending in side-by-side relation and having outer surfaces extending in a common plane and with juxtaposed side edges slightly spaced apart, said flat support strip and said flat electric conductors being semi-rigid and sufficiently flexible to extend in a non-linear path;

wherein said guard comprises said flexible support strip and flexible conductors, and an attachment means on the other of said oppositely facing surfaces, which together constitute means for bending said guard around and adhering said guard to an outer surface of a garbage container lid, so that said spaced apart flat conductors comprise the sides of an open electric circuit which is closable by the bridging of said flat conductors by one of the wet nose and tongue of a dog to deliver a shock thereto.

2. The guard of claim 1 wherein a layer of self-bonding adhesive bonds said flat electric conductors to said one of said oppositely facing flat surfaces of said flat support strip.

3. The guard of claim 1 wherein the other of said oppositely facing flat surfaces is coated with a layer of self-bonding adhesive as said attachment means.

4. The guard of claim 3 wherein a removable adhesive protective strip overlies said adhesive on said other of said oppositely facing surfaces of said support strip.

5. The guard of claim 1 wherein electric conductors connect adjacent ends of said flat conductors to poles of a battery.

6. The guard of claim 5 wherein said electric conductors connecting said flat conductors to said poles of a battery are flexible wire conductors.

7. The guard of claim 5 wherein means are provided for securing said battery to an inner surface of a garbage container from which an animal is to be repelled.

8. The guard of claim 5, wherein said battery is a 9 volt battery.

* * * * *